United States Patent
Wang et al.

(10) Patent No.: US 10,950,922 B2
(45) Date of Patent: Mar. 16, 2021

(54) BATTERY MONITORING DEVICE

(71) Applicant: Yazaki Corporation, Tokyo (JP)

(72) Inventors: Jian Wang, Susono (JP); Hironao Fujii, Susono (JP)

(73) Assignee: YAZAKI CORPORATION, Tokyo (JP)

( * ) Notice: Subject to any disclaimer, the term of this patent is extended or adjusted under 35 U.S.C. 154(b) by 0 days.

(21) Appl. No.: 16/507,447

(22) Filed: Jul. 10, 2019

(65) Prior Publication Data

US 2020/0058980 A1    Feb. 20, 2020

(30) Foreign Application Priority Data

Aug. 14, 2018  (JP) ............................. JP2018-152623

(51) Int. Cl.
| | |
|---|---|
| *H01M 10/42* | (2006.01) |
| *G01R 31/396* | (2019.01) |
| *H01Q 1/12* | (2006.01) |
| *H04Q 9/00* | (2006.01) |

(52) U.S. Cl.
CPC ............... *H01Q 1/125* (2013.01); *H04Q 9/00* (2013.01); *H04Q 2209/40* (2013.01)

(58) Field of Classification Search
None
See application file for complete search history.

(56) References Cited

U.S. PATENT DOCUMENTS

| | | |
|---|---|---|
| 2013/0149578 A1 | 6/2013 | Uchida |
| 2015/0028816 A1 | 1/2015 | Lee |
| 2016/0247389 A1 | 8/2016 | Shimizu et al. |
| 2019/0128970 A1* | 5/2019 | Taya ..................... G01R 31/371 |
| 2020/0028218 A1 | 1/2020 | Yamazoe et al. |
| 2020/0076013 A1* | 3/2020 | Sato .......................... H02J 7/02 |

FOREIGN PATENT DOCUMENTS

| | | |
|---|---|---|
| JP | 2012-085491 A | 4/2012 |
| JP | 2016-157681 A | 9/2016 |
| WO | 2018131338 A1 | 7/2018 |

* cited by examiner

*Primary Examiner* — Curtis A Kuntz
*Assistant Examiner* — Jerold B Murphy
(74) *Attorney, Agent, or Firm* — Sughrue Mion, PLLC (57) ABSTRACT

An object of the present invention is to provide a battery monitoring device in which communication quality is stabilized and improved. Detection boards are mounted respectively on a plurality of cells arranged in a line, and respectively have a first antenna for wirelessly communicating status information of the mounted cells. A second antenna for receiving the status information transmitted from the first antenna is mounted on an ECU board. The plurality of detection boards and the ECU board are disposed on upper surfaces of the plurality of cells as the same plane. The plurality of detection boards are arranged in a line along an arrangement direction. The ECU board is disposed at the center in the arrangement direction of the cells.

4 Claims, 8 Drawing Sheets

—— : XY PLANE ANTENNA DIRECTIVITY

FIG.7

---- : YZ PLANE ANTENNA DIRECTIVITY

BATTERY MONITORING DEVICE

TECHNICAL FIELD

The present invention relates to a battery monitoring device.

BACKGROUND ART

As a battery monitoring device for monitoring the state of a battery having a plurality of cells or a single cell, for example, those shown in Patent Literatures 1 and 2 have been proposed. The battery monitoring device shown in Patent Literatures 1 and 2 includes: a plurality of detection units that detect status information of each cell; and an ECU to which the status information from the plurality of detection units is transferred.

In Patent Literatures 1 and 2, a first antenna is mounted on a detection unit of each cell, and a plurality of second antennas disposed opposite to the first antenna of the detection unit are provided on a mounting member of a battery. By connecting the second antennas to the ECU, the status information is transferred wirelessly. However, it is necessary to provide the second antennas as many as the number of cells, and to connect the plurality of second antennas to the ECU, which causes a cost problem.

Therefore, it is desirable that only one second antenna can be mounted on the ECU to receive information from a plurality of detection units. However, depending on the arrangement of the detection unit and the ECU, another detection unit may be arranged on the communication path between the ECU and the detection unit, which may hinder the communication. Also, when communication cannot be made directly from the detection unit to the ECU, communication with the ECU via another detection unit (relay unit) is also conceivable. However, even in such a case, another detection unit may be disposed between the detection unit and the relay unit, which may hinder communication.

PRIOR ART DOCUMENT

Patent Literature

Patent Literature 1: JP 2016-157681 A
Patent Literature 2: JP 2012-85491 A

SUMMARY OF INVENTION

Technical Problem

The present invention has been made in view of the above background, and an object of the present invention is to provide a battery monitoring device in which communication quality is stabilized and improved.

Solution to Problem

According to one aspect of the present invention, there is provided a battery monitoring device comprising:
a plurality of first antennas respectively mounted on a plurality of battery modules arranged in a line and wirelessly transmitting status information of the battery modules;
a second antenna for receiving the status information transmitted from the first antennas; and
a monitoring unit that monitors the plurality of battery modules based on the status information received by the second antenna,
wherein the plurality of first antennas is mounted on a same plane, and
wherein the second antenna is disposed at the center in an arrangement direction of the battery modules.

Preferably, the plurality of first antennas may be arranged in a line along the arrangement direction, and the plurality of first antennas and the second antenna may be spaced apart in an orthogonal direction orthogonal to the arrangement direction in plan view.

Preferably, the second antenna may be disposed at the center in an orthogonal direction orthogonal to the arrangement direction in plan view, among the plurality of first antennas, the first antennas disposed at odd-numbered positions from one side in the arrangement direction may be disposed on one side in the orthogonal direction with respect to the second antenna, and among the plurality of first antennas, the first antennas disposed at even-numbered positions from the one side in the arrangement direction may be disposed on another side in the orthogonal direction with respect to the second antenna.

Preferably, the second antenna and the first antennas mounted on the battery modules arranged at both ends in the arrangement direction may be disposed at the center in an orthogonal direction orthogonal to the arrangement direction in plan view, among remaining first antennas, the first antennas disposed at odd-numbered positions from one side in the arrangement direction may be disposed on one side in the orthogonal direction with respect to the second antenna, among remaining first antennas, the first antennas disposed at even-numbered positions from the one side in the arrangement direction may be disposed on another side in the orthogonal direction with respect to the second antenna, and the first antennas mounted on the battery modules closer to the center in the arrangement direction may be disposed at positions farther from the center in the orthogonal direction.

Preferably, the first antennas may be mounted on ends of detection boards, and the detection boards may be disposed such that the ends on which the first antennas are mounted may be directed to the second antenna.

According to another aspect of the present invention, there is provided a battery monitoring device comprising:
a plurality of first antennas respectively mounted on a plurality of battery modules arranged in a line and wirelessly transmitting status information of the battery modules;
a second antenna for receiving the status information transmitted from the first antennas; and
a monitoring unit that monitors the plurality of battery modules based on the status information received by the second antenna,
wherein the plurality of first antennas is mounted on a same plane, and arranged along directions in which the directivities of the first antennas are the strongest on the same plane, and
wherein the second antenna is placed opposite to at least one of the plurality of first antennas in the same plane or in a plane orthogonal to the same plane in a direction in which the directivities of the first antenna and the second antenna are the strongest.

Effect of the Invention

As described above, according to these aspects, the communication quality can be stabilized and improved.

DESCRIPTION OF EMBODIMENTS

First Embodiment

Figure 1:
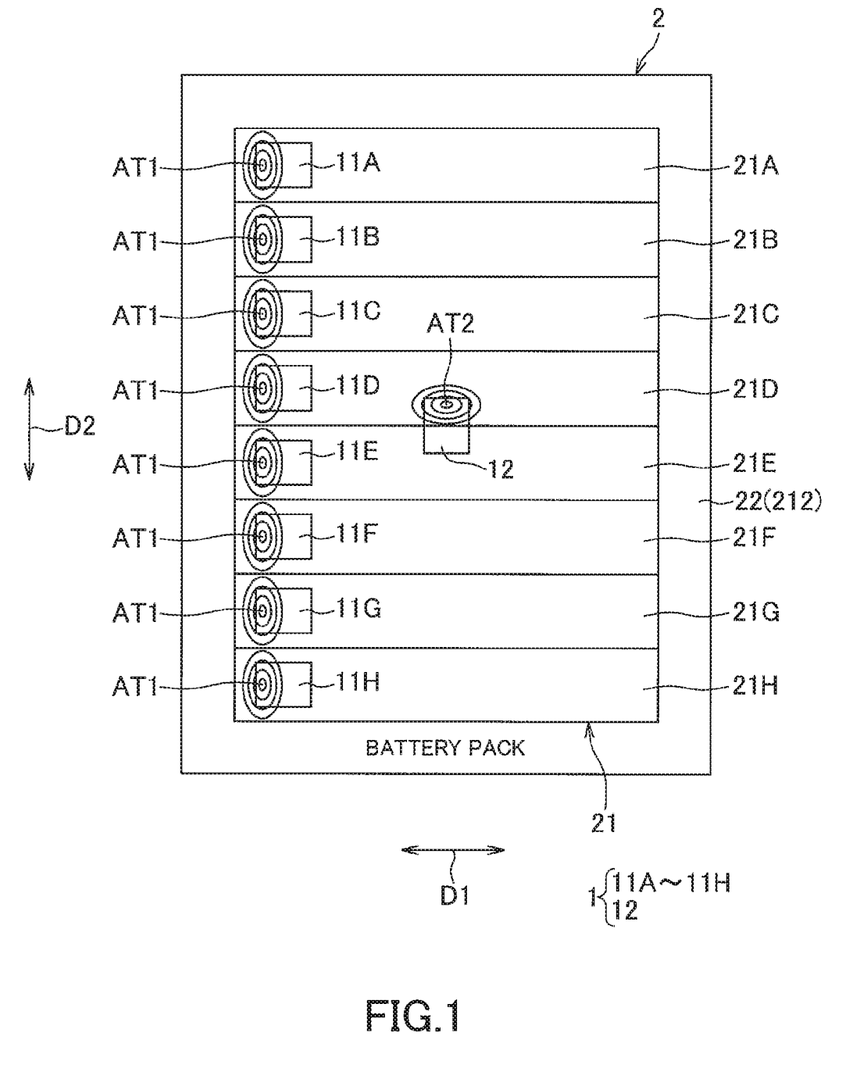
FIG. 1 is a top view of a battery monitoring device of the present invention mounted on a battery pack in a first embodiment.
Figure 2:
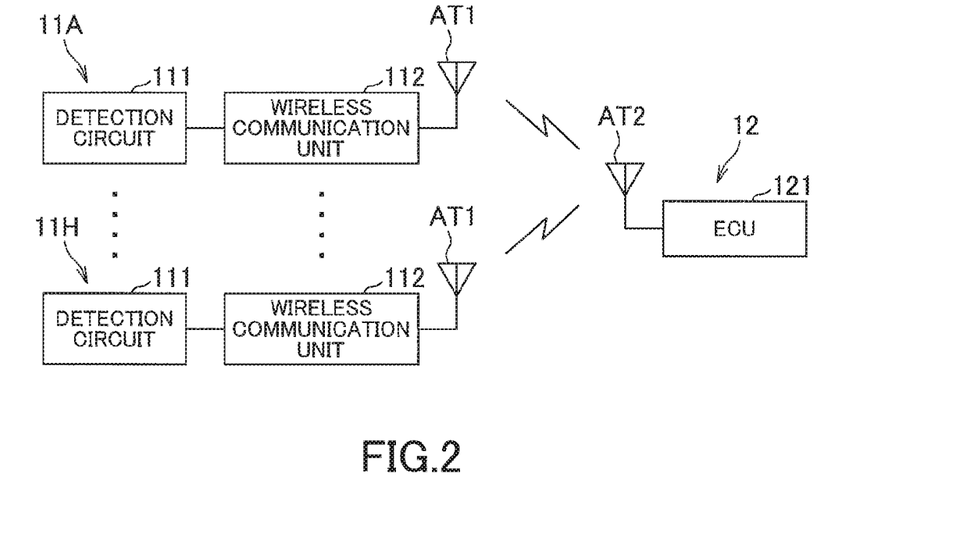
FIG. 2 is an electric block diagram of the battery monitoring apparatus shown in FIG. 1.

FIG. 1 is a top view of a battery monitoring device 1 of the present invention mounted on a battery pack 2 in a first embodiment. FIG. 2 is an electric block diagram of the battery monitoring apparatus 1 shown in FIG. 1. The battery monitoring device 1 is a device that monitors a state of the battery pack 2 mounted on a vehicle (not shown). Such a vehicle is a vehicle that travels by a driving force from an electric motor, such as a hybrid car or an electric car. The battery pack 2 supplies power to the electric motor mounted on the vehicle.

The battery pack 2 includes: a battery 21 composed of a plurality of battery modules 21A to 21H connected in series with each other; and a housing 22 for housing the battery 21. The plurality of battery modules 21A to 21H may be composed of a plurality of cells or may be composed of one cell. The plurality of battery modules 21A to 21H is provided in a box shape, and housed in the housing 22 in a line. A pair of electrodes (a positive electrode and a negative electrode) (not shown) is provided side by side in a width direction D1 on an upper surface of each of the battery modules 21A to 21H. In the cells constituting the battery modules 21A to 21H, positive electrodes and negative electrodes are alternately arranged, and are connected in series by connecting electrodes of adjacent cells.

The housing 22 includes: a housing body 212 whose upper surface is opened; and a lid (not shown) that covers the opening of the housing body 212. The plurality of battery modules 21A to 21H is accommodated in the housing body 212, and the upper surfaces of the battery modules 21A to 21H are covered with the lid (not shown).

The battery monitoring device 1 is a device that monitors the state of the battery modules that constitute the battery pack 2, and includes: a plurality of detection boards 11A to 11H mounted respectively on the plurality of battery modules 21A to 21H; and one ECU board 12. Incidentally, in the present embodiment, an example in which the plurality of detection boards 11A to 11H are mounted on the plurality of battery modules 21A to 21H will be described, but the present invention is not limited to this. One detection board may be mounted on the plurality of battery modules 21A to 21H.

The plurality of detection boards 11A to 11H is provided one by one with respect to the battery modules 21A to 21H, and one of the detection boards 11A to 11H is mounted on one of the battery modules 21A to 21H. As shown in FIG. 2, each of the plurality of detection boards 11A to 11H includes: a detection circuit 111 that detects status information (cell voltage, cell temperature, etc.) of the battery module mounted thereon; a wireless circuit 112; and a first antenna AT1 for wirelessly transmitting the status information of the battery module.

In the first embodiment, as shown in FIG. 1, the plurality of detection boards 11A to 11H is disposed on the top surfaces of the battery modules 21A to 21H. Further, the plurality of detection boards 11A to 11H is arranged in a line along an arrangement direction D2 of the battery modules 21A to 21H on one side in a width direction D1 of the upper surface of each of the battery modules 21A to 21H. Incidentally, the width direction D1 is a direction orthogonal to the arrangement direction D2 on the top surfaces of the battery modules 21A to 21H which are the same plane. Further, each of the detection boards 11A to 11H is, for example, a long substrate, and a longitudinal direction thereof is disposed along the width direction D1. The first antenna AT1 is disposed at one end of each of the detection boards 11A to 11H in the longitudinal direction, and disposed on a side away from the ECU board 12. Incidentally, in the present embodiment, an example will be described in which the first antenna AT1 is disposed on the side away from the ECU board 12. However, the present invention is not limited to this. The first antenna AT1 may be disposed on a side close to the ECU board 12.

One ECU board 12 is provided for the plurality of detection boards 11A to 11H. As shown in FIG. 2, a second antenna AT2 for receiving status information transmitted from the first antenna AT1 and an ECU 121 (monitoring unit) for monitoring and processing (cell abnormality detection processing, cell equalization processing, and the like) of the battery 21 based on the received status information are mounted on the ECU board 12. One (or many) second antenna AT2 is provided for the plurality of first antennas AT1.

The ECU board 12 is disposed at the center of the upper surface of the battery 21 as shown in FIG. 1. In detail, the ECU board 12 is disposed at the center in the width direction D1 and at the center in the line direction D2 of the battery 21 in top view. As a result, the ECU board 12 is separated from the plurality of detection boards 11A to 11H in the width direction D1. The ECU board 12 may be attached to the battery 21 and disposed on the upper surface of the battery 21, or may be attached to the lid (not shown) and disposed on the upper surface of the battery 21.

Incidentally, the communication between the detection boards 11A to 11H and the ECU board 12 may be a direct method in which the detection boards 11A to 11H communicate with the ECU board 12 directly. In addition, when each of the detection boards 11A to 11H cannot directly communicate with the ECU board 12, a relay method may be used in which other adjacent detection boards 11A to 11H are relayed to communicate with the ECU board 12.

According to the first embodiment described above, the first antennas AT1 mounted on each of the plurality of battery modules 21A to 21H are disposed on the same plane (upper surface) of the plurality of battery modules 21A to 21H, and the second antenna AT2 is disposed at the center in the arrangement direction D2. Thus, the first antennas AT1 of the other detection boards 11A to 11H are not arranged as much as possible in the communication path between the first antennas AT1 of the detection boards 11A to 11H and the second antenna AT2 of the ECU board 12. Thereby, communication quality can be stabilized and improved.

Further, according to the first embodiment described above, the plurality of first antennas AT1 is arranged in a line along the arrangement direction D2, and the plurality of first antennas AT1 and the second antenna AT2 are separated in the width direction D1. Thereby, even if the mounting position of the first antenna AT1 in each of the battery modules 21A to 21H is the same, the first antennas AT1 of the other detection boards 11A to 11H can be arranged as little as possible along the communication path between the first antenna AT1 of each of the detection boards 11A to 11H and the second antenna AT2 of the ECU board 12.

Incidentally, according to the first embodiment described above, the second antenna AT2 mounted on the ECU board 12 is disposed at the center of the upper surface of the battery 21 in the width direction D1. However, the present invention is not limited to this. The second antenna AT2 may be disposed at the center of the arrangement direction D2 of the upper surface of the battery 21 and may not be disposed at the center of the width direction D1.

Further, according to the first embodiment described above, the first antennas AT1 mounted on the detection boards 11A to 11H are arranged in a line along the arrangement direction D2, but the present invention is not limited to this. In the present invention, the second antenna AT2 may be disposed at the center in the arrangement direction D2 of the upper surface of the battery 21, and the first antennas AT1 may be mounted at any positions as long as they are mounted on the corresponding battery modules 21A to 21H.

Second Embodiment

Figure 3:
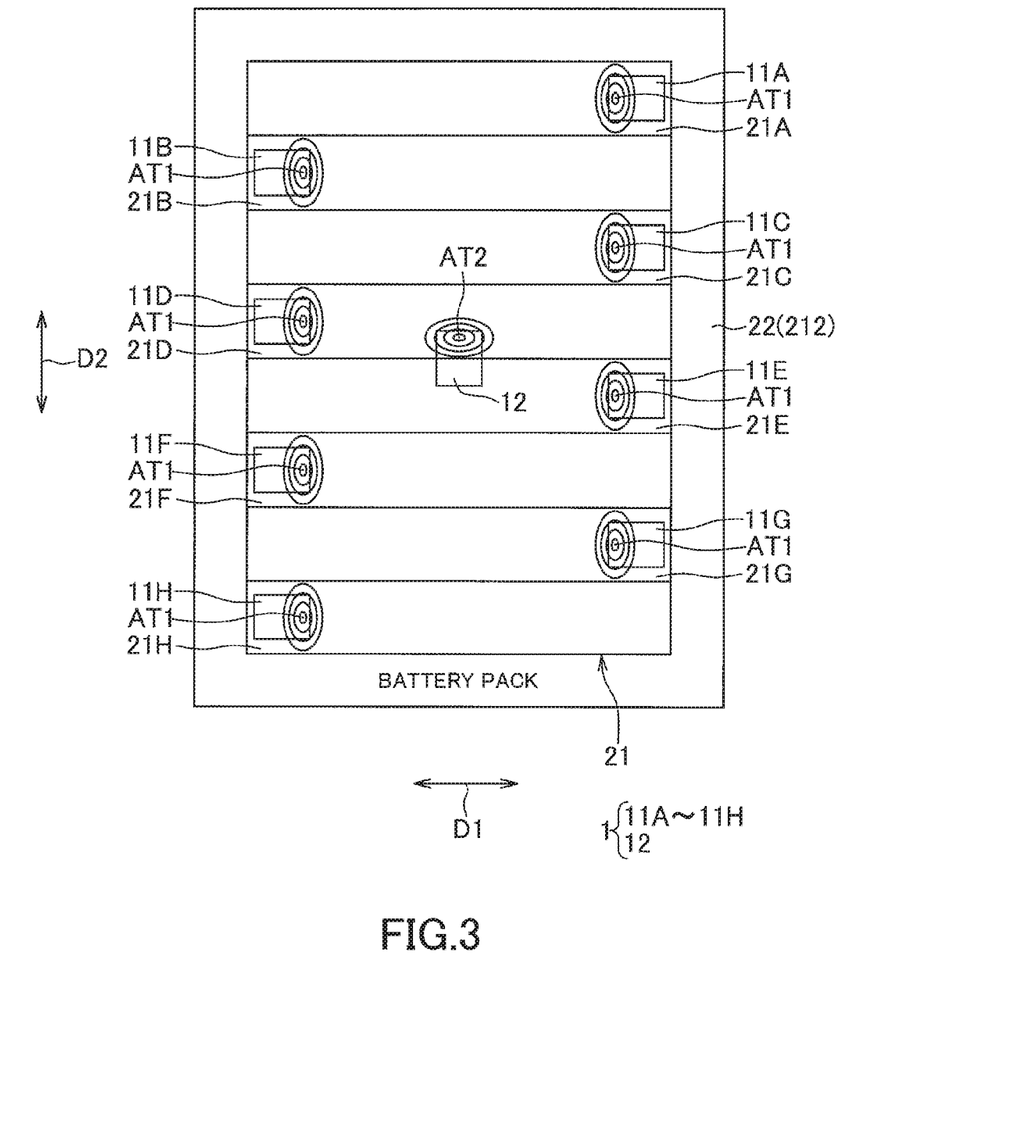
FIG. 3 is a top view of the battery monitoring device in a second embodiment.

Next, a battery monitoring device according to a second embodiment will be described with reference to FIG. 3. In FIG. 3, components equivalent to components already described in the first embodiment described above with reference to FIG. 1 are assigned the same reference signs and detailed explanations thereof will be omitted. A significant difference between the first embodiment and the second embodiment is the arrangement positions of the plurality of detection boards 11A to 11H and the ECU board 12.

In the second embodiment, the ECU board 12 is disposed at the center in the arrangement direction D2 and at the center in the width direction D1 of the battery 21 in top view. The ECU board 12 may be mounted on the battery 21 and disposed on the upper surface of the battery 21, or may be mounted on the lid (not shown) and disposed on the upper surface of the battery 21.

Further, in the second embodiment, as shown in FIG. 3, the plurality of detection boards 11A to 11H is disposed on the top surfaces of the battery modules 21A to 21H. Among the plurality of detection boards 11A to 11H, the detection boards 11A, 11C, 11E, and 11G disposed at odd-numbered positions from one side (upper side in the drawing) in the arrangement direction D2 are disposed on one side (right side in the drawing) in the width direction with respect to the ECU board 12 in a line along the arrangement direction D2. On the other hand, among the plurality of detection boards 11A to 11H, the detection boards 11B, 11D, 11F, and 11H disposed on even-numbered positions from the one side in the arrangement direction D2 are disposed on another side in the width direction D1 (left side in the drawing) with respect to the ECU board 12 in a line along the arrangement direction D2.

Further, each of the detection boards 11A to 11H is, for example, a long substrate, and arranged such that a longitudinal direction thereof is along the width direction D1. The first antenna AT1 is disposed at one end of each of the detection boards 11A to 11H in the longitudinal direction, and the one end is disposed toward the ECU board 12.

According to the embodiment described above, the first antennas AT1 of the other detection boards 11A to 11H are not arranged as much as possible in the communication path between the first antennas AT1 of the detection boards 11A to 11H and the second antenna AT2 of the ECU board 12. Thereby, communication quality can be stabilized and improved.

In addition, even when the communication between the first antenna AT1 of each of the detection boards 11A to 11H and the second antenna AT2 of the ECU board 12 is a relay system, the first antennas AT1 of the other detection boards 11A to 11H are arranged as little as possible between the first antennas AT1 of the detection boards 11A to 11H and the first antennas AT1 of the detection boards 11A to 11H to be relayed. Thereby, communication quality can be stabilized and improved.

Third Embodiment

Figure 4:
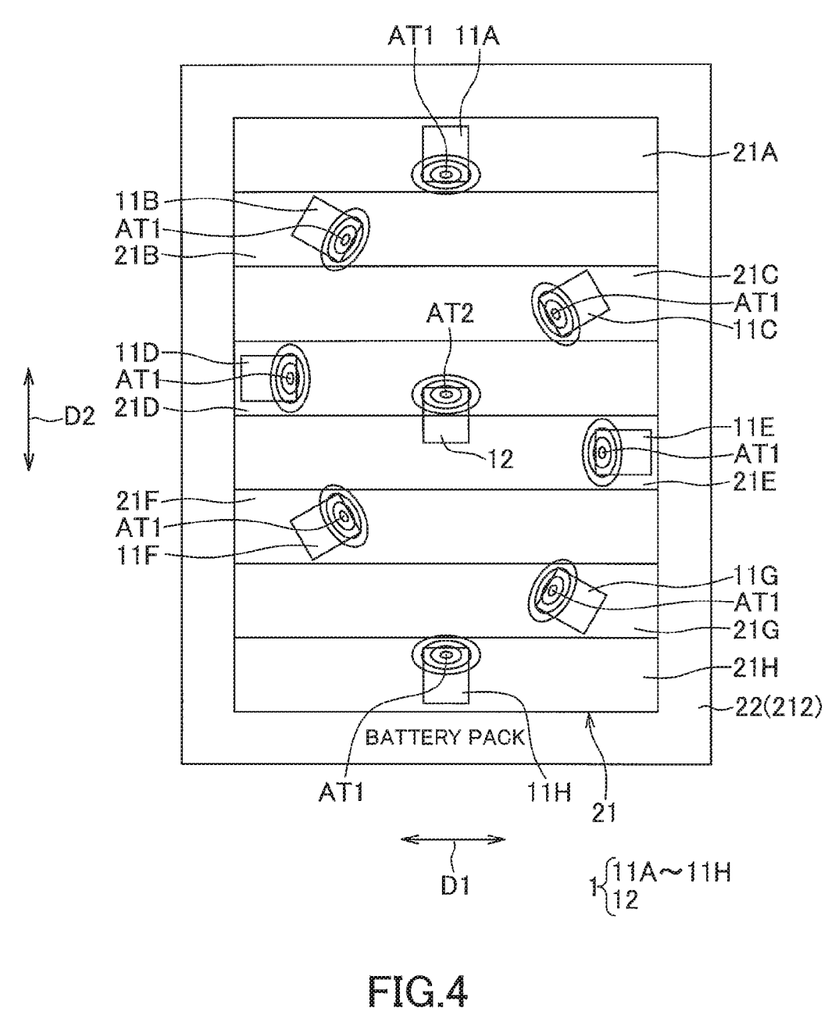
FIG. 4 is a top view of the battery monitoring device in a third embodiment.

Next, a battery monitoring device according to a third embodiment will be described with reference to FIG. 4. In FIG. 4, components equivalent to components already described in the first embodiment described above with reference to FIG. 1 are assigned the same reference signs and detailed explanations thereof will be omitted. A significant difference between the first embodiment and the third embodiment is the arrangement positions of the plurality of detection boards 11A to 11H and the ECU board 12.

In the third embodiment, the ECU board 12 is disposed at the center in the arrangement direction D2 and at the center in the width direction D1 of the battery 21 in top view. The ECU board 12 may be mounted on the battery 21 and disposed on the upper surface of the battery 21, or may be mounted on the lid (not shown) and disposed on the upper surface of the battery 21.

Further, in the third embodiment, as shown in FIG. 4, the plurality of detection boards 11A to 11H is disposed on the top surfaces of the battery modules 21A to 21H. Among the plurality of detection boards 11A to 11H, the detection boards 11A and 11H mounted on the battery modules 21A and 21H disposed at both ends in the arrangement direction D2 are disposed at the center in the width direction D1 on the upper surface of the battery modules 21A and 21H.

Figure 5:
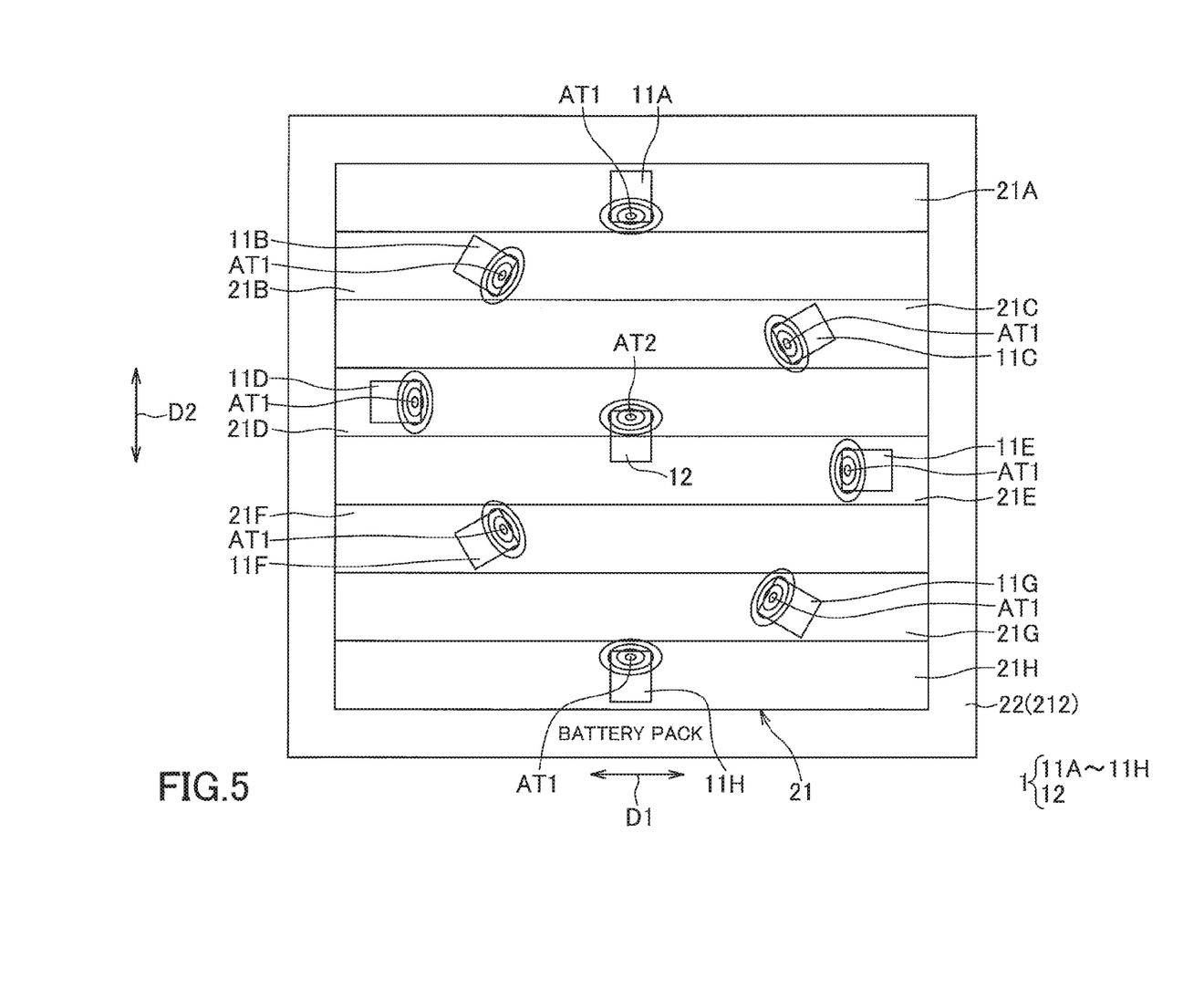
FIG. 5 is a top view of the battery monitoring device in a modification of the third embodiment.

Further, among the remaining detection boards 11B to 11G, the detection boards 11C, 11E, and 11G disposed at odd-numbered positions from one side (upper side in the drawing) of the arrangement direction D2 are one side (right side in the drawing) in the width direction D1 with respect to the ECU board 12. On the other hand, among the remaining detection boards 11B to 11G, the detection boards 11B, 11D and 11F disposed at even-numbered positions from the one side in the arrangement direction D2 are disposed on another side (left side in the drawing) in the width direction D1 with respect to the ECU board 12. Further, the detection boards 11A to 11H mounted on the battery modules 21A to 21H closer to the center in the arrangement direction D2 are disposed at positions farther away from the center in the width direction D1. Incidentally, in the present embodiment, as shown in FIGS. 4 and 5, the first antenna AT1 mounted on the detection boards 11B, 11C, 11F, and 11G is arranged diagonally with respect to the width direction D1 and the arrangement direction D2 so that the direction of the first antenna AT1 faces the ECU board 12. However, the present invention is not limited to this. The directions of the first antennas AT1 mounted on the detection boards 11B, 11C, 11F, and 11G may be disposed, for example, parallel to the width direction D1 or the arrangement direction D2.

Further, each of the detection boards 11A to 11H is, for example, a long substrate, and the first antenna AT1 is disposed at one end of each of the detection boards 11A to 11H in the longitudinal direction. Each of the detection boards 11A to 11H is arranged such that one end on which the first antenna AT1 is mounted is disposed toward the ECU board 12. Thereby, communication quality can be stabilized and improved.

As a result, as shown in FIG. 4, the ECU board 12 can be disposed at the center of the upper surface of the battery 21, and the plurality of detection boards 11A to 11H can be disposed along a circle surrounding the ECU board 12. Then, the longitudinal direction of each of the detection boards 11A to 11H is disposed along a radial direction centering on the ECU board 12.

According to the third embodiment, the other detection boards are not arranged as much as possible in the communication path between the first antennas AT1 of the detection boards 11A to 11H and the second antenna AT2 of the ECU board 12. Thereby, communication quality can be stabilized and improved. Moreover, since the distances between the first antennas AT1 of the detection boards 11A to 11H and the second antenna AT2 of the ECU board 12 can be further equalized as compared with the second embodiment, the communication quality can be further stabilized and improved.

In addition, even when the communication between each of the detection boards 11A to 11H and the ECU board 12 is a relay system, the first antennas AT1 of the other detection boards 11A to 11H are arranged as little as possible between the first antennas AT1 of the detection boards 11A to 11H and the first antennas AT1 of the detection boards 11A to 11H to be relayed. Thereby, communication quality can be stabilized and improved. In addition, since the distances between the first antennas AT1 of the detection boards 11A to 11H and the first antennas AT1 of the other detection boards 11A to 11H can be equalized, the communication quality can be further stabilized and improved.

Next, a modification of the third embodiment will be described with reference to FIG. 5. In FIG. 5, components equivalent to components already described in the third embodiment described above with reference to FIG. 4 are assigned the same reference signs and detailed explanations thereof will be omitted. A significant difference between the third embodiment and the modification is the configuration of the battery 21.

As shown in the figure, the upper surface of the battery 21 is approximated to a square. Since the arrangement of the plurality of detection boards 11A to 11H and the ECU board 12 is the same as in the third embodiment, the detailed description is omitted here. Thus, by approximating the upper surface of the battery 21 to a square, the distances between the first antennas AT1 of the detection boards 11A to 11H and the second antenna AT2 of the ECU board 12, and the distances between the first antennas A1 of the detection boards 11A to 11H and the first antennas A1 of the other detection boards 11A to 11H can be further equalized, and communication quality can be stabilized and improved.

Fourth Embodiment

Figure 6:
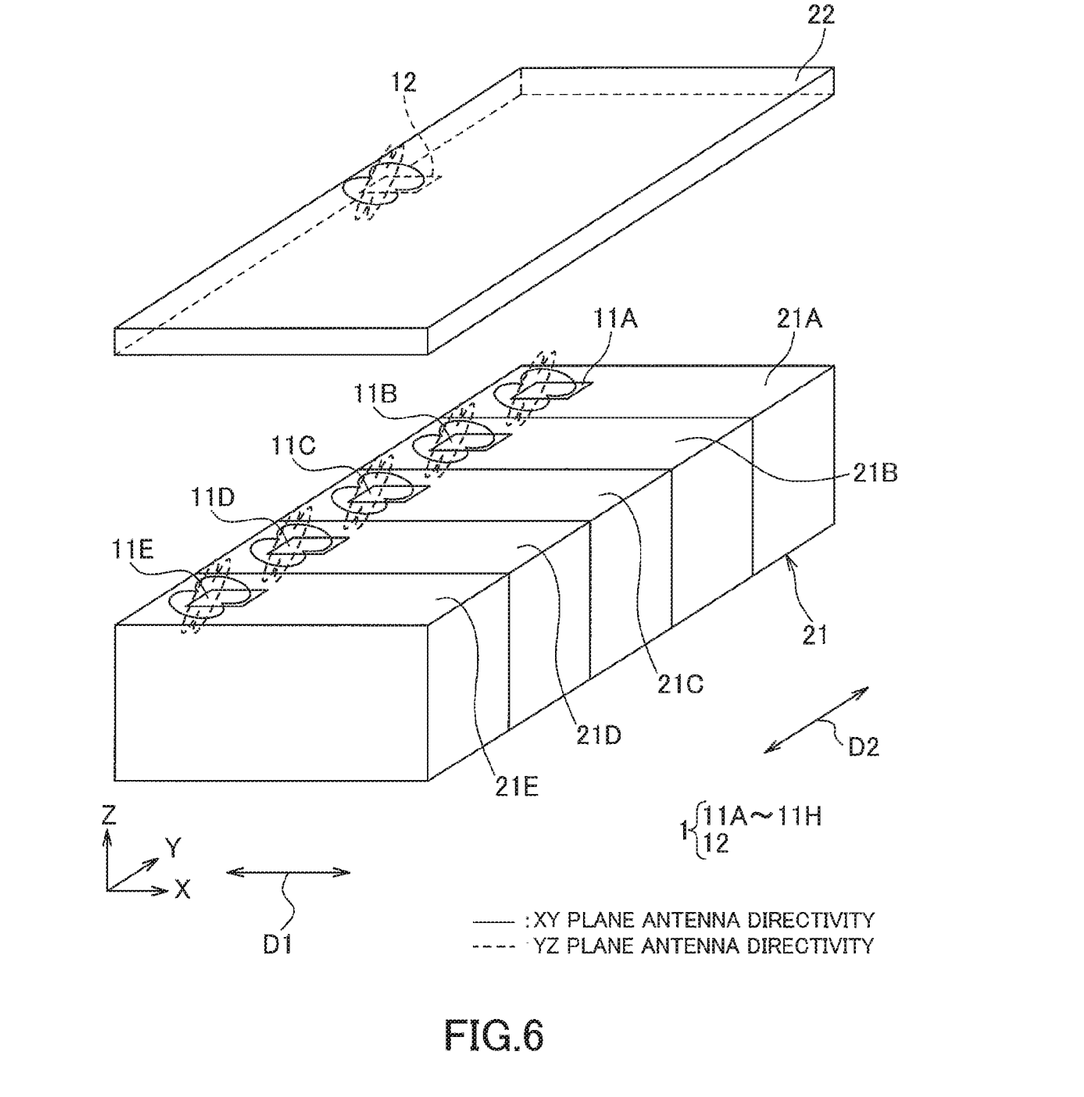
FIG. 6 is an exploded perspective view of the battery monitoring device in a fourth embodiment.
Figure 7:
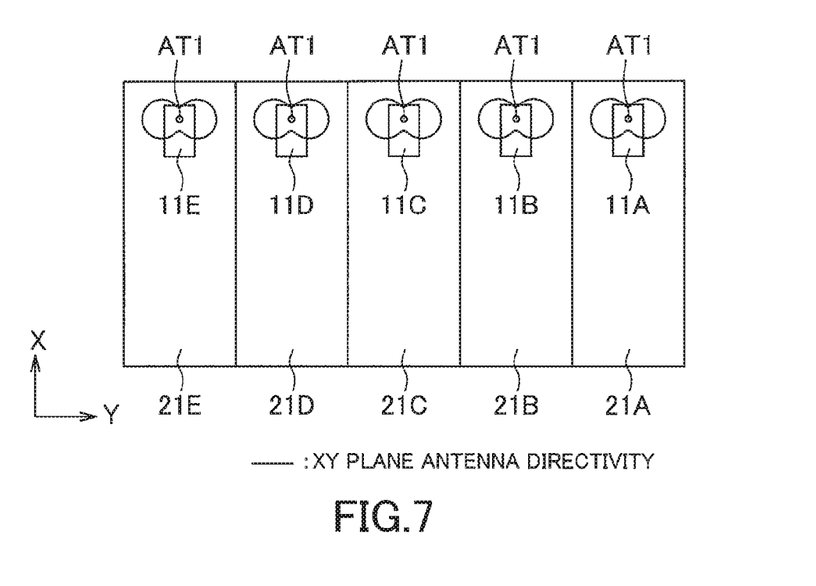
FIG. 7 is a top view of FIG. 6.
Figure 8:
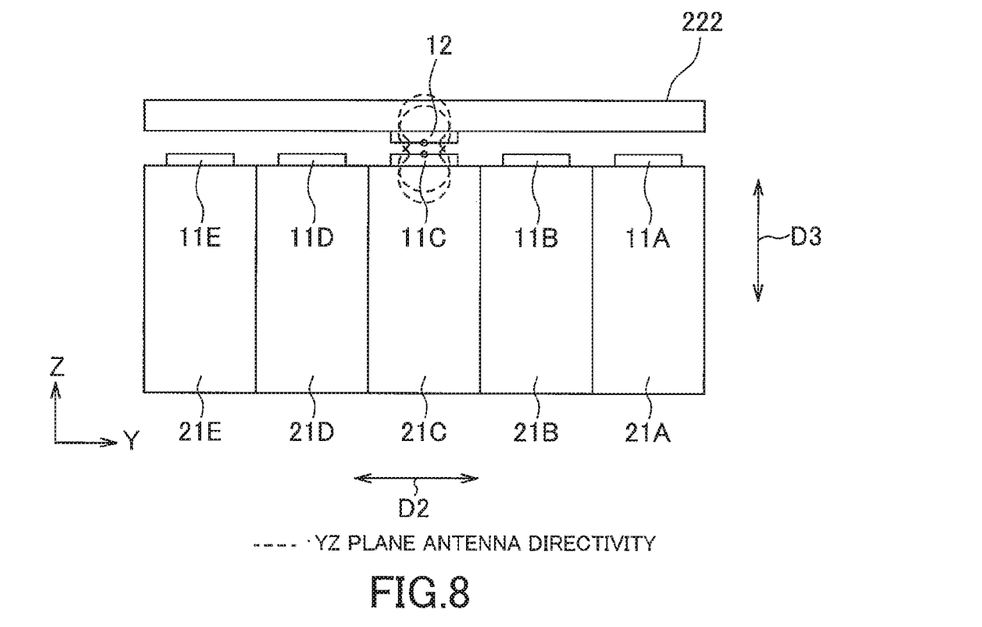
FIG. 8 is a side view of FIG. 6.

Next, a battery monitoring device according to a fourth embodiment will be described with reference to FIGS. 6 to 8. In FIGS. 6 to 8, components equivalent to components already described in the first embodiment described above with reference to FIG. 1 are assigned the same reference signs and detailed explanations thereof will be omitted. A significant difference between the first embodiment and the fourth embodiment is the arrangement positions of the plurality of detection boards 11A to 11E and the ECU board 12. Moreover, in the present embodiment, unlike the first to third embodiments, the battery 21 is configured of five battery modules 21A to 21E, and five detection boards 11A to 11E are mounted on the respective battery modules 21A to 21E.

The plurality of detection boards 11A to 11E is disposed on the upper surfaces (xy plane) of the plurality of battery modules 21A to 21E. Further, as shown in FIG. 7, the plurality of detection boards 11A to 11E is disposed along a direction in which the directivity of the first antenna AT1 is the strongest on the xy plane. In the present embodiment, the direction in which the directivity of the first antenna AT1 is the strongest in the xy plane is parallel to the arrangement direction D2, and the plurality of detection boards 11A to 11E is arranged in a line along the arrangement direction D2.

As shown in FIG. 8, the ECU board 12 and the detection board 11C disposed at the center among the plurality of detection boards 11A to 11E are disposed opposite to each other in a direction in which the directivity of the first antenna AT1 and the second antenna AT2 is the strongest on the yz plane orthogonal to the xy plane. In the present embodiment, the direction in which the directivity of the first antenna AT1 and the second antenna AT2 is the strongest in the yz plane is a height direction D3, and the detection board 11C and the ECU board 12 are provided opposite to each other in the height direction D3. Incidentally, the height direction D3 is the z-axis direction of the yz plane, and is a direction orthogonal to both the width direction D1 and the arrangement direction D2. In the present embodiment, an example is shown in which the first antenna AT1 and the second antenna AT2 are disposed opposite to each other in the direction in which the directivity is the strongest on the yz plane. However, the first antenna AT1 and the second antenna AT2 may be disposed opposed to each other in the direction in which the directivity is strongest on the xz plane.

The communication method in the fourth embodiment described above adopts, for example, direct communication between the detection boards 11A to 11H and the ECU board 12 as in the first embodiment. If direct communication cannot be performed (at the time of abnormality), the detection boards 11A to 11H may communicate with the ECU board 12 via another detection board. Alternatively, the detection boards 11A to 11H may be basically relayed to the detection board 11C with the first antenna AT1 having the strongest directivity. In the example of the fourth embodiment, detection boards 11A to 11H may be relayed to the detection board 11C having the strongest directivity with the ECU board 12.

According to the fourth embodiment described above, the plurality of first antennas AT1 are arranged along the direction in which the directivity of the first antenna AT1 is the strongest (arrangement direction D2) on the top surfaces of the plurality of battery modules 21A to 21E. The second antenna AT2 and the first antenna AT1 of the detection board 11C among the plurality of detection boards are disposed opposite to the direction in which the directivity of the first antenna AT1 and the second antenna AT2 is the strongest (height direction D3) on the yz plane. Thereby, the radio wave strength between the first antennas AT1 of the detection boards 11A to 11E and between the first antenna AT1 of the detection board 11C and the second antenna AT2 of the ECU board 12 can be increased, and the communication quality can be stabilized and improved.

Incidentally, according to the fourth embodiment described above, the ECU board 12 is disposed opposite to the detection board 11C, but the present invention is not limited to this. The ECU board 12 may be disposed opposite to one of the detection boards 11A to 11E, and may be disposed opposite to any one of the detection boards 11A, 11B, 11D, and 11E.

Figure 9:
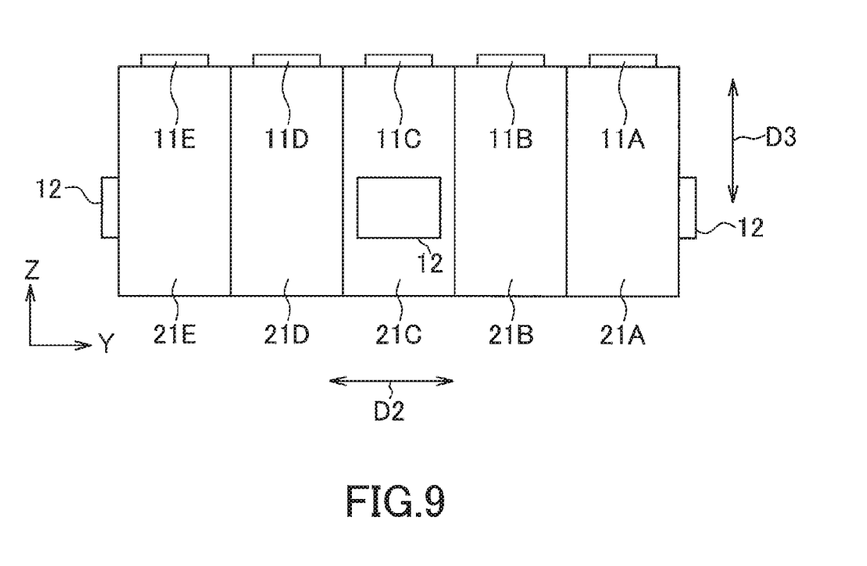
FIG. 9 is a side view of the battery monitoring device in the other embodiment.

Further, according to the first to fourth embodiments described above, the ECU board 12 is provided on the lid 222, but the present invention is not limited to this. For example, as shown in FIG. 9, the ECU board 12 is disposed on the side surface of the battery modules 21A to 21E. Then, the second antenna AT2 and the first antenna AT1 of at least one of the detection boards 11A to 11E (for example, the detection board 11C) are disposed such that the directivity may be enhanced.

Incidentally, the present invention is not limited to the above embodiment. That is, various modifications can be made without departing from the scope of the present invention.

REFERENCE SIGNS LIST 1 battery monitoring device
11A-11H detection board
121 ECU (monitoring unit)
21A-21H battery module
111 detection circuit
AT1 first antenna
AT2 second antenna
D1 width direction (orthogonal direction)
D2 arrangement direction

The invention claimed is:

1. A battery monitoring device comprising:
a plurality of battery modules arranged in a line;
a plurality of first antennas for respectively mounted on the plurality of battery modules and wirelessly transmitting status information of the battery modules;
a second antenna for receiving the status information transmitted from the first antennas; and
a monitoring unit that monitors the plurality of battery modules based on the status information received by the second antenna,
wherein the plurality of first antennas is mounted on a same plane,
wherein the second antenna is disposed at the center in an arrangement direction of the battery modules,
wherein the second antenna is disposed at the center in an orthogonal direction orthogonal to the arrangement direction in plain view,
wherein among the plurality of first antennas, the first antennas disposed at odd-numbered positions from one side in the arrangement direction are disposed on one side in the orthogonal direction with respect to the second antenna, and
wherein among the plurality of first antennas, the first antennas disposed at even-numbered positions from the one side in the arrangement direction are disposed on another side in the orthogonal direction with respect to the second antenna.

2. The battery monitoring device as claimed in claim 1, wherein the first antennas are mounted on ends of detection boards, and
wherein the detection boards are disposed such that the ends on which the first antennas are mounted are directed to the second antenna.

3. A battery monitoring device comprising:
a plurality of battery modules arranged in a line;
a plurality of first antennas for respectively mounted on the plurality of battery modules and wirelessly transmitting status information of the battery modules;
a second antenna for receiving the status information transmitted from the first antennas; and
a monitoring unit that monitors the plurality of battery modules based on the status information received by the second antenna,
wherein the plurality of first antennas is mounted on a same plane,
wherein the second antenna is disposed at the center in an arrangement direction of the battery modules,
wherein the second antenna and the first antennas mounted on the battery modules arranged at both ends in the arrangement direction are disposed at the center in an orthogonal direction orthogonal to the arrangement direction in plain view,
wherein among the first antennas that are not mounted on the battery modules arranged at both ends in the arrangement direction, the first antennas disposed at odd-numbered positions from one side in the arrangement direction are disposed on one side in the orthogonal direction with respect to the second antenna,
wherein among the first antennas that are not mounted on the battery modules arranged at both ends in the arrangement direction, the first antennas disposed at even-numbered positions from the one side in the arrangement direction are disposed on another side in the orthogonal direction with respect to the second antenna, and
wherein the first antennas mounted on the battery modules closer to the center in the arrangement direction are disposed at positions farther from the center in the orthogonal direction.

4. The battery monitoring device as claimed in claim 3, wherein the first antennas are mounted on ends of detection boards, and
wherein the detection boards are disposed such that the ends on which the first antennas are mounted are directed to the second antenna.

* * * * *